(No Model.)

A. B. HENDRYX.
CHAIN.

No. 429,444. Patented June 3, 1890.

Witnesses.
J. H. Shumway
Lillian D. Kelsey

Andrew B. Hendryx
Inventor
By Atty.
Earle Seymour

UNITED STATES PATENT OFFICE.

ANDREW B. HENDRYX, OF NEW HAVEN, CONNECTICUT.

CHAIN.

SPECIFICATION forming part of Letters Patent No. 429,444, dated June 3, 1890.

Application filed February 19, 1890. Serial No. 341,039. (No model.)

*To all whom it may concern:*

Be it known that I, ANDREW B. HENDRYX, of New Haven, in the county of New Haven and State of Connecticut, have invented new Improvements in Chains, (Case A;) and I do hereby declare the following, when taken in connection with accompanying drawings and the letters of reference marked thereon, to be a full, clear, and exact description of the same, and which said drawings constitute part of this specification, and represent, in—

Figure 1:
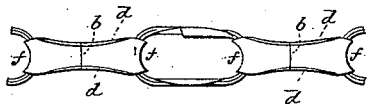
Figure 2:
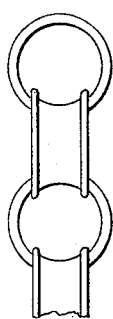
Figure 3:
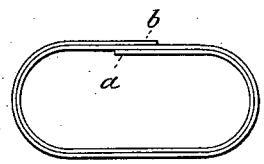
Figure 4:
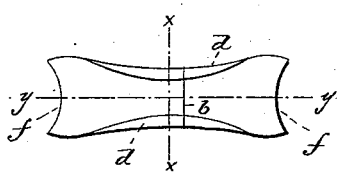
Figure 5:
Figure 6:
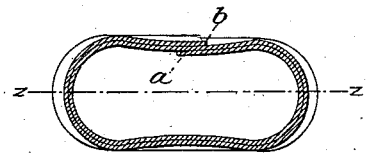
Figure 7:

Figure 1, a side view of a portion of a chain composed of several elongated links embodying the invention; Fig. 2, a side view of a ring-shaped link embodying the same invention; Fig. 3, a side view representing the strip of metal bent into the link shape; Fig. 4, a top view of the link; Fig. 5, a transverse section on line $x\ x$ of Fig. 4; Fig. 6, a longitudinal section on line $y\ y$ of Fig. 4; Fig. 7, a longitudinal section cutting on line $z\ z$ of Fig. 6; and Figs. 8, 9, and 10, modifications, Figs. 3 to 10, inclusive, being enlarged.

This invention relates to an improvement in the construction of that class of chain in which the links are made from sheet metal.

In the more general construction of this class of chain the waste of metal is very great, consequently increasing the cost of the chain over what it would be were there not so great a waste.

The object of my invention is the construction of a chain from sheet metal without waste, yet simple and cheap; and it consists in the construction as hereinafter described, and particularly recited in the claim.

The link is made from a strip of sheet metal about twice the length of the circumference of the link, the metal being wound upon itself, so as to make each link composed of substantially two convolutions or two thicknesses. As represented in Fig. 1, the links are oblong; but as represented in Fig. 2 the links may be of ring shape.

In the manufacture of the link the strip of sheet metal is of a width and thickness corresponding to the size or strength of the link required. This strip is then coiled or bent flatwise into link shape, as seen in Fig. 3, the coil doubling the thickness of the metal around the link, and so that one end $a$ of the metal will come upon the inside of the link, while the other end $b$ will stand upon the outside. The metal should be of such character or temper that when thus coiled the coils will readily lie close together.

To strengthen the link and prevent the ends from starting from the surface upon which they lie, the edges of the link where the ends meet or pass each other are turned over onto the outside, as at $d\ d$, Fig. 5. This is done by striking the link laterally, forcing the metal of the edges over onto itself, thus producing a double edge through the portion of the link where the lap occurs, and that the link may appear uniform in shape the opposite side is struck or closed in like manner, as at $e\ e$, Fig. 5. This closing or turning over of the edges runs from the center and dies out toward each end of the link, as seen in Fig. 4, and that the outer surface of the link may be straight the central portion of the link is curved inward, as seen in Fig. 6. This turning of the edges of the link gives a rounded finish to the edge and interlocks the ends, so as to prevent their rising or being turned out of their proper position, and thus practically secures the ends of the link.

Figure 8:
Figure 9:
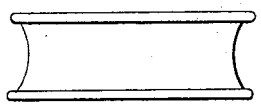

As it is desirable to make the ends of the links semicircular in the plane of the link, it is also desirable that the inner surface of the link shall present a transverse convex surface that the ends of the links may readily work one upon another, as if made from round wire. To do this the end portions of the link are struck or curved transversely inward, as seen in Figs. 4 and 7, which gives to the interior of the ends of the link a transverse concave shape, which will correspond to the curve of the links in the plane of the links, and thus permit the links to work freely one upon the other. In the smaller chain, however, the links may be made with the ends square, as seen in Fig. 8, and without the transverse rounding of the inner surface. The inward turning or overlapping of the edges, as at $d\ d$ and $e\ e$, may be continued entirely around the link, as represented in Fig. 9, and the inward or transverse curving of the link may be continued entirely around the link, as also seen in the same Fig. 9, and in making round or ring links, as seen in Fig.

2, this will be the simpler construction, as it gives to the link a neat finish and greatly strengthens it, and may be done by dies prepared for the purpose in a cheap and simple manner.

I have represented the meeting or overlapping ends of the metal as coming upon one side of the link; but it will be understood that this meeting or overlapping may be at any point in the circumference of the link.

It will be understood that the strip of metal of which each link is composed may be of a length so great as to make more than two convolutions. I find, however, in practice that two convolutions are sufficient.

Figure 10:

While I prefer to turn the metal outward for the interlocking of the ends or finish of the edge of the link, as I have described, it will be understood that the metal may be turned inward, as seen in Fig. 10.

I do not wish to be understood as claiming, broadly, a chain-link made from a strip of metal wound upon itself to produce several convolutions, as such I am aware is not new.

I claim—

A chain-link composed of a strip of sheet metal coiled flatwise upon itself to produce a link of two or more thicknesses, the edges of the link at the points where the ends of the strip terminate turned laterally onto the body, so as to substantially double the edge and interlock the ends, substantially as described.

ANDREW B. HENDRYX.

Witnesses:
FRED C. EARLE,
LILLIAN D. KELSEY.